March 13, 1928. 1,662,520
A. F. JENKINS
CUTTING AND WELDING TORCH
Filed Jan. 20, 1927 2 Sheets-Sheet 1
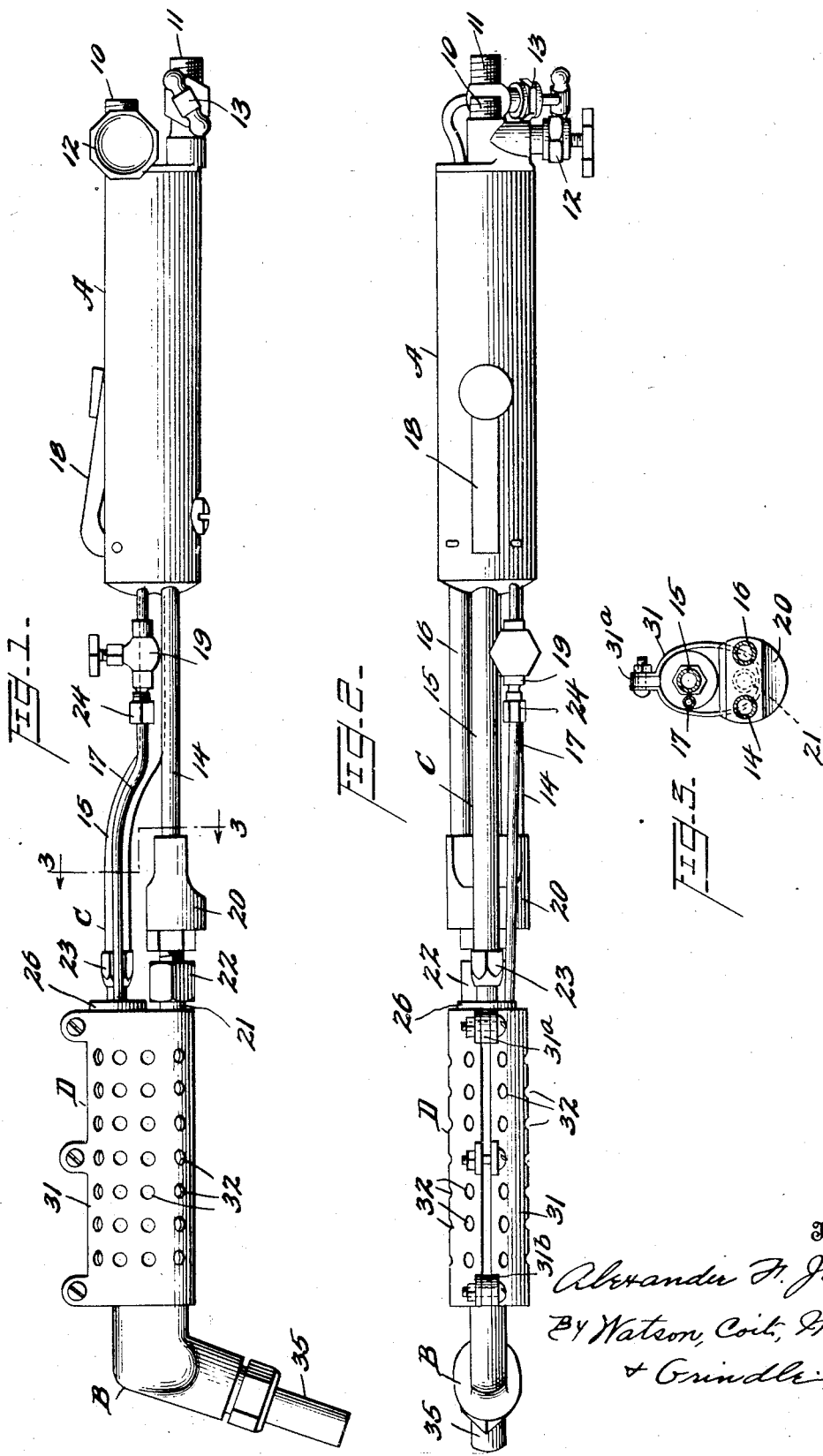

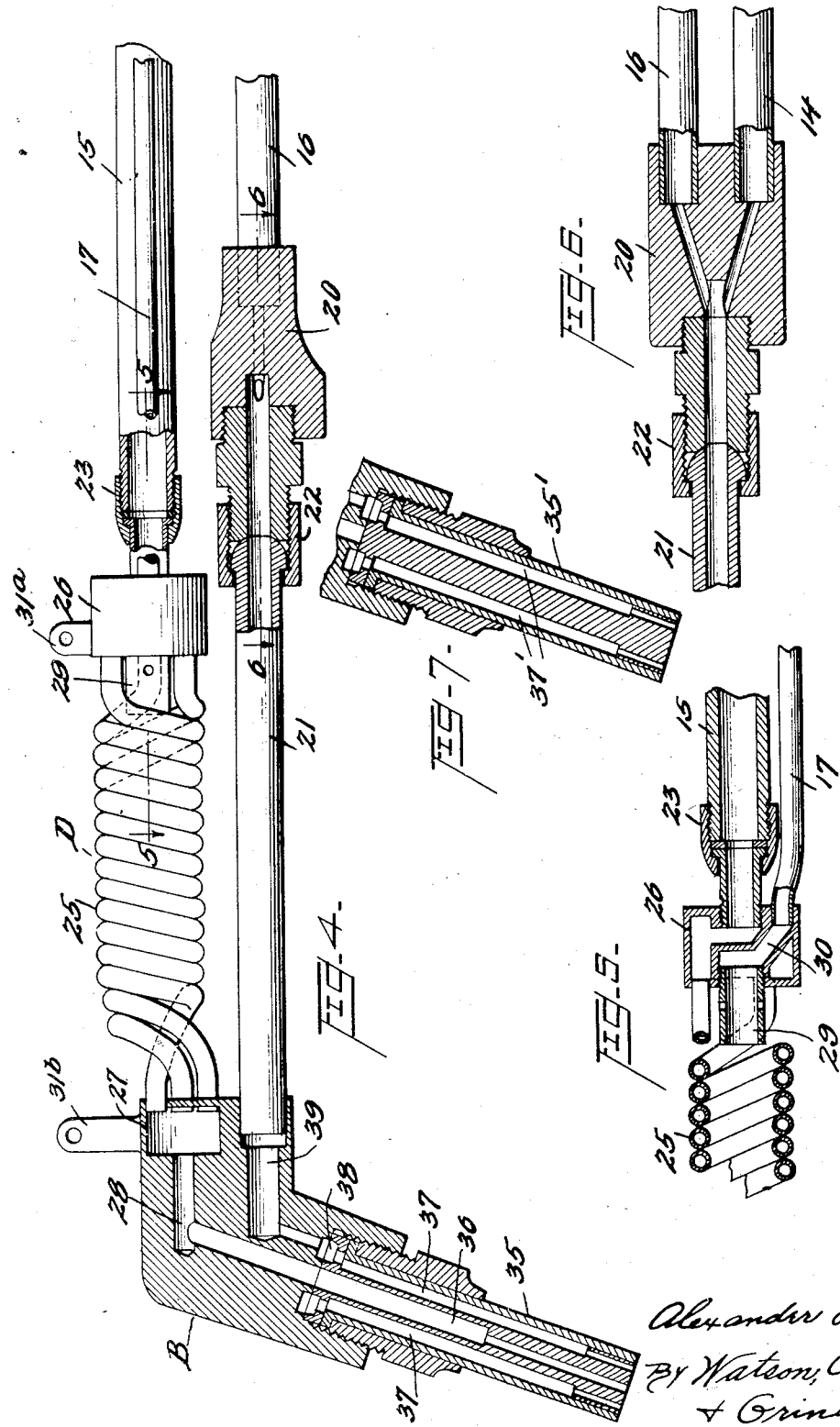

Patented Mar. 13, 1928.

1,662,520

UNITED STATES PATENT OFFICE.

ALEXANDER F. JENKINS, OF BALTIMORE, MARYLAND.

CUTTING AND WELDING TORCH.

Application filed January 20, 1927. Serial No. 162,375.

This invention relates to cutting and welding torches and particularly to torches of this class which are adapted to burn ordinary illuminating gas in admixture with or in an atmosphere of oxygen or other combustion supporting gas.

It is known that the heating efficiency of certain gases used in connection with cutting and welding torches may be materially increased for such purposes by preheating them as they are fed to the torch. The increase in efficiency due to such preheating is quite noticeable when ordinary house illuminating gas is employed with oxygen as the combustion supporting medium. The present applicant has found that for cutting operations, best results are obtained when the preheating is applied principally to the additional oxygen supplied while the torch is being used for such cutting, whereas for ordinary welding operations when the supplemental supply of oxygen is cut off, the torch will give the required degree of heating and with fair efficiency without the preheating of any of the gases.

The principal object of this invention is to provide a torch having provision for preheating the gases flowing to the tip, in which such preheating is effected in the most advantageous manner. Another object is to provide a preheating device which will apply heat to the gases just before they reach the point at which they are burned so that the benefits of such preheating will not be lost through cooling of the gases before they reach the point of combustion.

It is a further object of this invention to provide a torch which is sturdy and compact, neat in appearance, easily handled in use and generally improved in its design.

One embodiment of this invention is shown by way of example in the accompanying drawings forming part of this specification, and in which:

Fig. 1 is a side elevation of this improved torch;

Fig. 2 is a top plan view thereof;

Fig. 3 is a section on the line 3—3 of Fig. 1;

Fig. 4 is an enlarged view partly in section and with the cover omitted, of the left hand portion of Fig. 1, showing the torch equipped with a cutting tip;

Fig. 5 is a section on the line 5—5 of Fig. 4;

Fig. 6 is a section on the line 6—6 of Fig. 4; and

Fig. 7 is a section through the cutting head of the torch similar to that shown in Fig. 4 but showing a welding tip instead of a cutting tip.

In general the torch consists of a handle portion A, a head portion B, and a plurality of connecting tubes C, which not only serve to conduct the gases flowing to the head but also serve to support the head in rigid spaced relation to the handle. The handle also has at that end remote from the head, the rear end, a pair of couplings 10, 11 for connecting the tubes of the torch with the usual flexible conduits for oxygen and illuminating gas. These couplings are provided with valves 12, 13 for controlling the flow of gases to the tip of the torch.

The conduit leading from the oxygen coupling 10 is divided rearwardly of the valve 10 and the illuminating gas coupling 11 has a small conduit 17 branching from the rear side of the valve 13 thereof. The tubes from the couplings 10, 11 all extend through the handle and are clearly shown emerging from the front end thereof where they appear as a burning-oxygen-tube 14, a cutting-oxygen-tube 15, a torch-gas-tube 16, and a burner-gas-tube 17. The handle A is of well known construction and its details need not be particularly described. It is provided with the usual latch lever 18 which operates the valve regulating the flow of cutting oxygen through tube 15. The small tube 17 for burner gas is provided with a valve 19 for regulating the flow of illuminating gas therethrough so that the burner supplied thereby may be used or dispensed with as desired.

At some distance from the handle the burning-oxygen-tube 15 and the torch-gas-tube 16 are connected to a mixing manifold 20 where the gases are intimately mixed and thereafter flow to the torch head through a single mixture tube 21 connected to the mixing manifold by a union 22. The cutting oxygen tube 15 is provided with a union 23 while the burner-gas-tube 17 is provided with a similar union 24 thus together with union 22 providing for the complete removal of the head portion B and related parts from handle portion A and its related parts.

Beyond the coupling 23 the cutting-oxygen tube 15 is provided with a heater generally designated by the letter D. A plurality of small helical tubes are arranged to form a heating coil 25 which is connected at one end to the tube 15 by a manifold 26 and at the other end to the head B by a manifold 27. It is to be noted that the manifold 27 is in reality a part of the head itself and leads to a single central passage or duct 28 in the head. A burner 29 is secured to the metal portion of the manifold 26 so as to extend forwardly into the interior of the heating coil 25 and is supplied with gas from the tube 17 which tube extends through the manifold or opens into a duct 30 extending through the manifold. A removable shield 31 is provided to surround the heating coil and also the mixture tube 21 to prevent the flame of the burner from being extinguished by air drafts. Lugs 31ª and 31ᵇ are provided on the handle and head respectively for attachment of the shield. The shield thus extended between the handle and head provides additional rigidity which is a desirable feature at all times and particularly when the tubes become soft from heat. The shield is provided with a large number of perforations 32 through which air may have access to the burner and the products of combustion thereof escape. By positioning the mixture tube 21 within the shield for the heating coil some of the heat confined within the shield will be passed to the tube 21 to heat to some extent the mixture of gases flowing therethrough.

Fig. 4 shows the torch supplied with a cutting tip 35 having a central passage 36 and an annular group of circular passages 37 enveloping this central passage. The central passage is in alignment with the passage 28 which supplies the cutting oxygen, while the passages 37 open into an annular channel 38 supplied with a mixture of oxygen and illuminating gas from a passage 39 connected with the mixture tube 21. The welding tip 35' shown in Fig. 7 has no central passage for cutting oxygen but has the annular group of mixture ducts 37'. When the welding tip is used the supply of cutting oxygen will be stopped by the valve lever 18 and the burner 29 will at the same time be disconnected by closing valve 19 in the burner tube 17.

It will be apparent from the above description that a torch of an improved design having good working balance, neat appearance, convenient assembly and pronounced efficiency has been provided. But it will also be apparent that the invention may be embodied in other forms, and I do not therefore limit myself to any physical embodiment thereof except as generally described in the appended claims.

Having thus described the invention, what is claimed as new and desired to be secured by Letters Patent is:

1. In a torch, in combination, spaced handle and head portions, conduits for gases connecting said portions, and a heating means disposed along the conduits adjacent the head portion of the torch for heating at least a portion of the gases passing through the conduits, said heating means comprising a series of small spirally arranged tubes branching from one or more of the conduits, all of said small tubes being arranged in one group in the form of a hollow cylinder which is in alignment with said conduits, a manifold at each end of the cylinder for connecting the small tubes directly to the conduits and head portion respectively, and a gas burner arranged within the hollow interior of said cylinder and in alignment therewith.

2. In a torch, in combination, spaced handle and head portions, conduits for illuminating gas and oxygen leading to the rear end of said handle, main valves for said conduits, said oxygen conduit having branching cutting oxygen and welding oxygen conduits arranged within said handle, said illuminating gas conduit having branching torch and burner conduits also arranged within said handle, said burner and cutting oxygen conduits being independent of the main valves, a valve beyond the handle for the burner conduit, a valve at the handle for the cutting oxygen conduit, a mixing manifold connected to said welding oxygen and torch conduits, a mixture conduit connecting said mixing manifold to the torch head, a heating coil of small tubes for cutting oxygen arranged adjacent the head but spaced a considerable distance from said handle, manifolds connecting said coil directly to the cutting oxygen conduit and head respectively, a burner connected to the burner conduit arranged within said coil between the manifolds thereof, and a perforated shield for said coil and said mixture conduit.

3. In a torch, in combination, spaced handle and head portions, conduits for cutting oxygen, welding oxygen, illuminating gas for the torch, and illuminating gas for a burner arranged within and extending from said handle, a heating coil for said cutting oxygen conduit adjacent said head, manifolds at each end of the coil connecting it with the cutting oxygen conduit and the head, a burner within said coil between the manifolds, said burner being supplied with gas from said burner conduit, a mixing manifold connecting the outer ends of the welding oxygen and torch conduits, and a mixture conduit disposed adjacent to the heating coil for connecting the mixing manifold and the head.

In testimony whereof I hereunto affix my signature.

ALEXANDER F. JENKINS.